(12) United States Patent  
Sugiyama (10) Patent No.: US 9,709,876 B2  
(45) Date of Patent: Jul. 18, 2017

(54) OPTICAL DEVICE

(71) Applicant: CANON KABUSHIKI KAISHA, Tokyo (JP)

(72) Inventor: Tomohiko Sugiyama, Chikusei (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/056,759

(22) Filed: Feb. 29, 2016

(65) Prior Publication Data

US 2016/0259227 A1   Sep. 8, 2016

(30) Foreign Application Priority Data

Mar. 3, 2015   (JP) .................... 2015-041188

(51) Int. Cl.
*G03B 17/14* (2006.01)
*G02B 7/10* (2006.01)
*G03B 3/02* (2006.01)
*G03B 3/10* (2006.01)
*G03B 5/00* (2006.01)

(52) U.S. Cl.
CPC ........... *G03B 17/14* (2013.01); *G02B 7/10* (2013.01); *G03B 3/02* (2013.01); *G03B 3/10* (2013.01); *G03B 5/00* (2013.01); *G03B 2205/0053* (2013.01)

(58) Field of Classification Search
CPC ........... G01D 5/3473; G01D 5/34776; G01D 5/34792; G03B 17/14; G02B 7/10
See application file for complete search history.

(56) References Cited

U.S. PATENT DOCUMENTS 9,121,735 B2    9/2015  Noguchi
2011/0109788 A1*  5/2011  Santo .................. G02B 7/023
                                                   348/345

FOREIGN PATENT DOCUMENTS

JP        2014-035438 A      2/2014

\* cited by examiner

*Primary Examiner* — Rochelle-Ann J Blackman  
(74) *Attorney, Agent, or Firm* — Cowan, Liebowitz & Latman, P.C.

(57) ABSTRACT

An optical device that includes first and second members that is rotatable relative to the first member is provided that includes a coupling unit that is provided for the second member; and a position detecting unit that has a detecting part disposed at the first member and a detected part disposed at the second member, and is configured to detect a position of the second member relative to the first member. When viewed from a direction along a rotation central axis of the second member, an angle between a first axis and a second axis at a position within a rotational range of the second member is 90 degrees. The first axis is an axis that is perpendicular to the rotation central axis and passes through the detecting part and the second axis is an axis that is perpendicular to the rotation central axis and passes through the coupling unit.

6 Claims, 13 Drawing Sheets

OPTICAL DEVICE

BACKGROUND OF THE INVENTION

Field of the Invention

The present invention relates to an optical device comprising an encoder detecting a position of an object to be measured.

Description of the Related Art

An optical device such as an interchangeable lens mounted on an image pickup device comprises a lens driving mechanism unit that moves a focusing lens and a variable power lens constituting an optical system in the direction of an optical axis. The lens driving mechanism unit is provided with an encoder for detecting a position of the lens. A configuration of such a lens driving mechanism unit having an encoder is disclosed in Japanese Patent Laid-Open No. 2014-35438. The lens driving mechanism unit of Japanese Patent Laid-Open No. 2014-35438 comprises a base part, a cylinder part that is rotatable relative to the base part in a circumferential direction, and at least three support parts that rotatably support the cylinder part with respect to the base part. A coupling unit provided for the cylinder part, a scale part mounted on the cylinder part, and a detecting part detecting a position of the cylinder part relative to the base part using the scale part are disposed. In the configuration of this lens drive system, the positions of the coupling unit and the detecting part are symmetrical with respect to the center of the cylinder part, and overlap each other in the direction of the optical axis. Thereby, space efficiency is improved.

In the related art, due to unnecessary motion of the cylindrical member within a backlash in the direction of the optical axis, for the purpose of avoiding a drop in detection precision of the position detecting encoder, the cylindrical member is required to be pushed in the direction of the optical axis by a pressing leaf spring without a backlash. For this reason, components called a pressing spring, a slip ring, and a differential roll are needed, and the number of components increases.

SUMMARY OF THE INVENTION

The present invention provides an optical device that includes a position detecting unit of a rotary member, improves position detecting precision, and reduces the number of components.

A device according to the present invention, an optical device that includes a first member and a second member that is rotatable relative to the first member is provided that includes a coupling unit that is provided for the second member; and a position detecting unit that has a detecting part disposed at the first member and a detected part disposed at the second member, and is configured to detect a position of the second member relative to the first member, wherein, when viewed from a direction along a rotation central axis of the second member, an angle between a first axis and a second axis at a position within a rotational range of the second member is 90 degrees, and wherein the first axis is an axis that is perpendicular to the rotation central axis and passes through the detecting part and the second axis is an axis that is perpendicular to the rotation central axis and passes through the coupling unit.

According to the present invention, it is possible to improve position detecting precision of a rotary member and reduce the number of components.

Further features of the invention will become apparent from the following description of exemplary embodiments with reference to the attached drawings.

DESCRIPTION OF THE EMBODIMENTS

Hereinafter, an embodiment of the present invention will be described with reference to the drawings. The present embodiment can be applied to a variety of optical devices (e.g., a lens device, an image pickup device, etc.) comprising a position detecting unit of a rotary member. In the present embodiment, a lens barrel is given as an example of the optical device comprising the position detecting unit.

Figure 1:
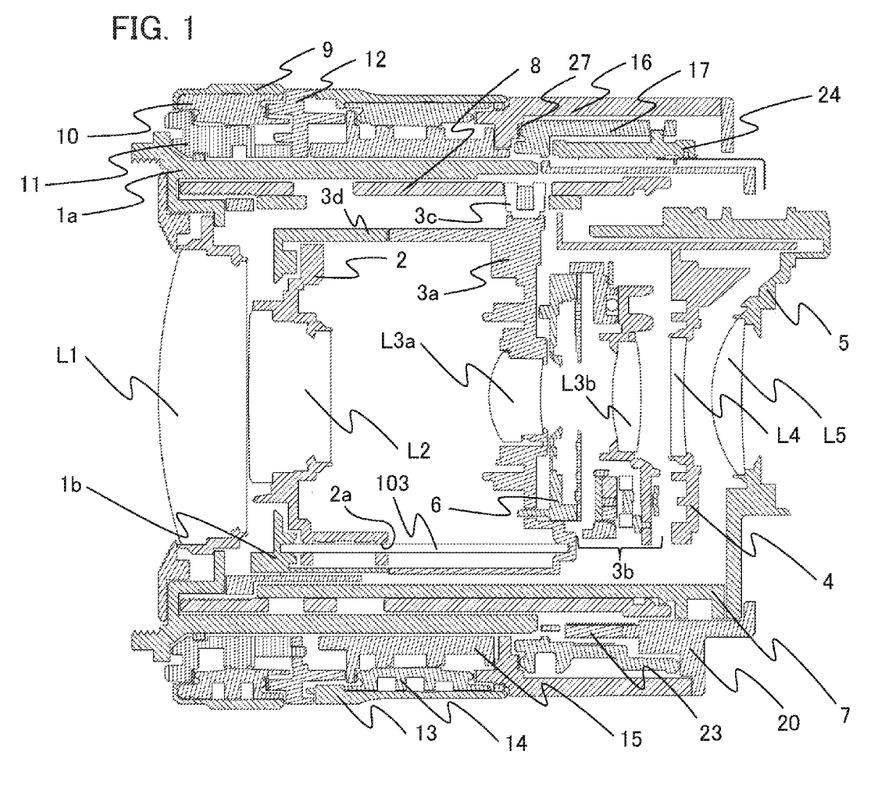
FIG. 1 is a sectional view illustrating a configuration of an entire lens barrel in the present embodiment.

FIG. 1 is a sectional view illustrating a configuration of an entire lens barrel according to the present embodiment. In the present specification, for the description of a positional relationship between parts, the side of an object is defined as a front side, and the side of an image pickup part is defined as a rear side. Also, in a radial direction (radial direction having an optical axis as a central axis), a side close to the optical axis is defined as an inner circumference side, and a side distant from the optical axis is defined as an outer circumference side.

An image shooting optical system of the present embodiment has a first group lens L1, a second group lens L2, a third group lens L3a, a diaphragm unit 6, a vibration-proof lens L3b (for image blur correction), a focusing lens L4, and a fifth group lens L5 from the front side. A first group moving member 1a holds the first group lens L1, and the second group moving member 2 holds the second group lens L2. A third group moving member 3a holds the third group lens L3a. A vibration-proof unit 3b holds the vibration-proof lens L3b, and moves the vibration-proof lens L3b in a direction perpendicular to the optical axis, thereby correcting image blur. The vibration-proof unit 3b is fixed to the third group moving member 3a. The first group lens L1, the second group lens L2, the third group lens L3a, and the vibration-proof unit 3b constitute a variable power optical system that carries out a variable power operation by moving in a direction of the optical axis.

A focus moving member 4 holds the focusing lens L4. A guide mechanism depending on a guide bar (not illustrated) and a drive mechanism depending on a voice coil motor (not illustrated) are provided to move the focusing lens L4 in the direction of the optical axis, and thereby focus adjustment is performed. A fifth fixing member 5 is a member that holds the fifth group lens L5. To change an aperture diameter of the optical system, the diaphragm unit 6 moves the diaphragm blade within a plane perpendicular to the optical axis using a driver (not illustrated) to adjust a quantity of light. The diaphragm unit 6 is fixed to the third group moving member 3a.

A guide cylinder 7 is a member that rectilinearly guides the third group moving member 3a, and has a plurality of guide grooves. The guide cylinder 7 of the present embodiment is fixed to the fifth fixing member 5, and has three guide grooves parallel to the optical axis in a circumferential direction. A cam cylinder 8 is a rotary member that is fitted around an outer circumference of the guide cylinder 7 and rotates at a fixed position. A plurality of cam grooves are provided in a circumferential direction of the cam cylinder 8, and drive and hold the first, second, and third group moving members 1a, 2, and 3a holding the variable power lens groups in the direction of the optical axis. In the present embodiment, three cam grooves for the first group lens L1, one cam groove for the second group lens L2, and three cam grooves for the third group lens L3a are provided for a total of seven cam grooves.

The first group moving member 1a has a plurality of first group cam followers (not illustrated). The first group cam followers are substantially uniformly allotted on an inner circumference of the first group moving member 1a, and are disposed around the optical axis at intervals of a predetermined angle (about 120 degrees). A position of the first group moving member 1a in the direction of the optical axis is determined by engagement between a pair of first group cam followers and a first group of cam grooves of the cam cylinder 8. The other two pairs of first group cam followers and the first group of cam grooves perform reinforcement when the lens barrel is shocked by, for instance, disturbance. The second group moving member 2 has second group cam followers at an outer circumference thereof. A position of the second group moving member 2 in the direction of the optical axis is determined by engagement between a pair of second group cam followers and the second group of cam grooves of the cam cylinder 8.

The third group moving member 3a has a plurality of third group cam followers 3c. The third group cam followers 3c are substantially uniformly allotted on an outer circumference of the third group moving member 3a, and are disposed around the optical axis at intervals of a predetermined angle (about 120 degrees). A position of the third group moving member 3a in the direction of the optical axis is determined by engagement between the plurality of third group cam followers 3c, the third group of cam grooves of the cam cylinder 8, and the guide grooves of the guide cylinder 7.

The third group moving member 3a has a sleeve hole (not illustrated) and a U groove in an outer side thereof, and is fitted with a plurality of guide bars (not illustrated) that are fixed and held to the first group moving member 1a and a first group pressing member 1b. Thereby, the third group moving member 3a determines an optical axis of the first group moving member 1a. Also, the third group moving member 3a fixes and holds a plurality of guide bars (only the guide bar 103 is illustrated in FIG. 1) at an interior thereof along with the third group pressing member 3d. These guide bars are fitted with a sleeve hole 2a and a U groove (not illustrated) which are provided in the second group moving member 2. Thereby, the third group moving member 3a determines an optical axis of the second group moving member 2.

A manual focus (hereinafter abbreviated to "MF") exterior ring 9 and an MF operating ring 10 are operating members used for a manual operation of the focus adjustment. The MF operating ring 10 is fixed integrally with the MF exterior ring 9, and is rotatably supported in a state in which it is sandwiched between an MF fixing member 11 and an MF cover member 12. When a photographer operates the MF exterior ring 9 to rotate the MF operating ring 10, a sensor (not illustrated) detects such rotation. A focus adjustment operation is performed according to an amount of rotation of the MF operating ring 10.

Figure 2:
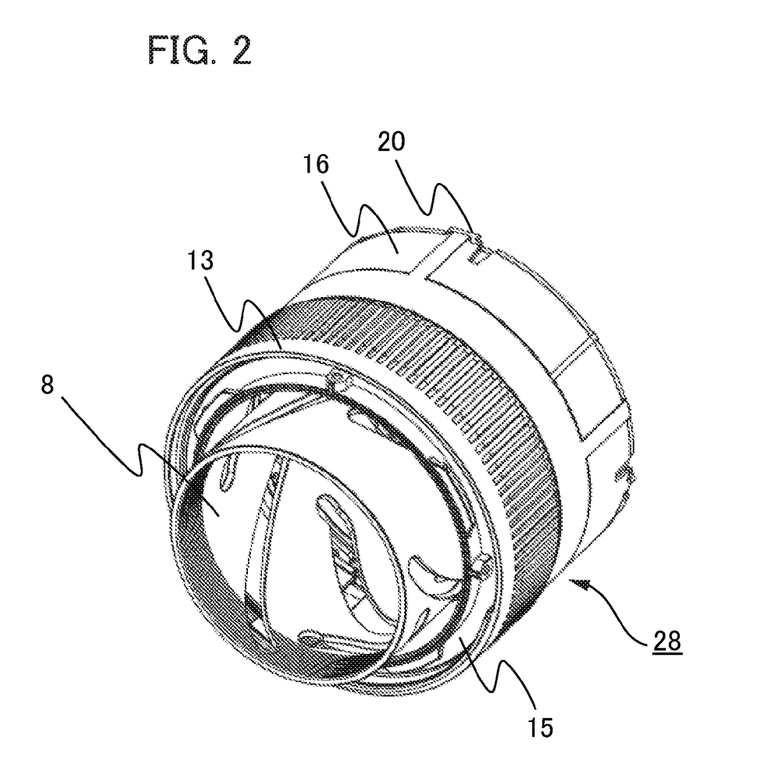
FIG. 2 is a perspective view illustrating a zoom driving unit in the present embodiment.
Figure 3:
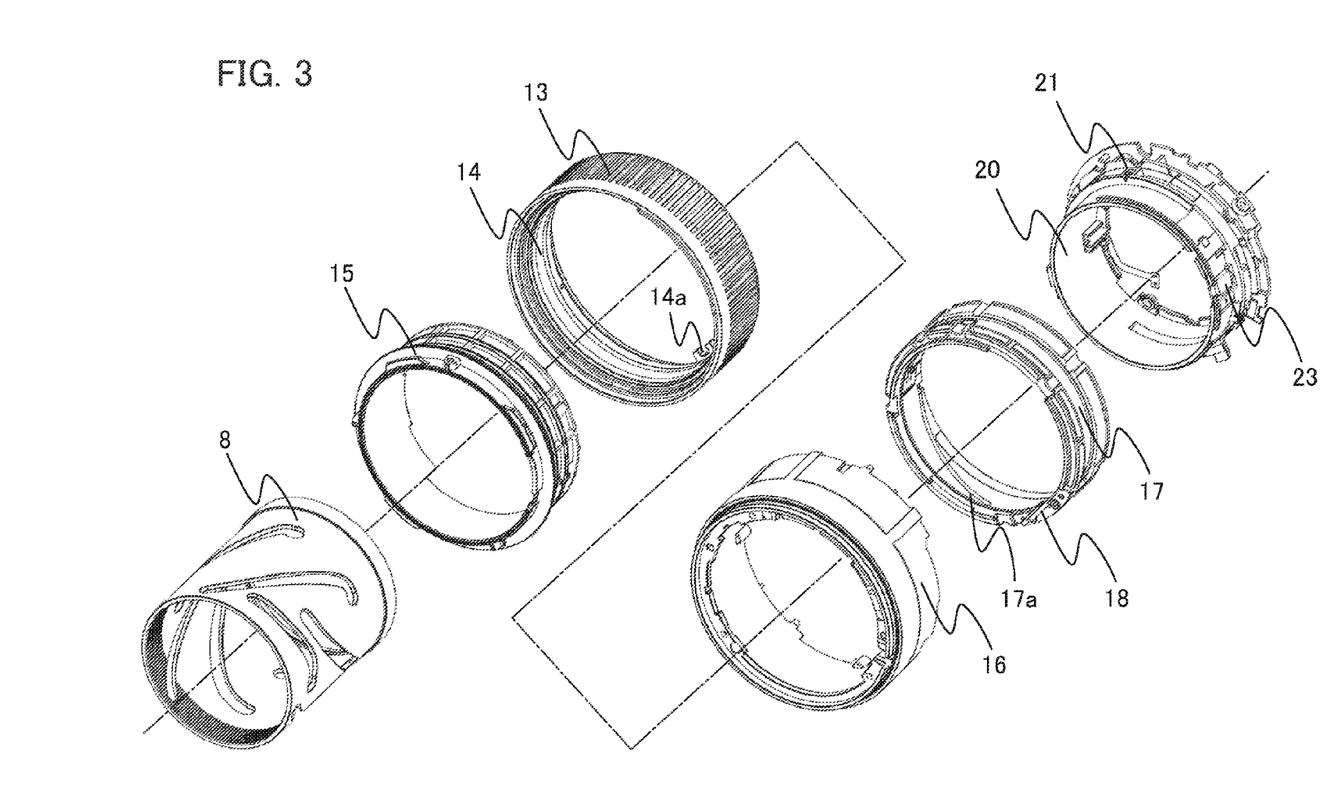
FIG. 3 is an exploded perspective view of the zoom driving unit of FIG. 2 when viewed from the side of an object.
Figure 4:
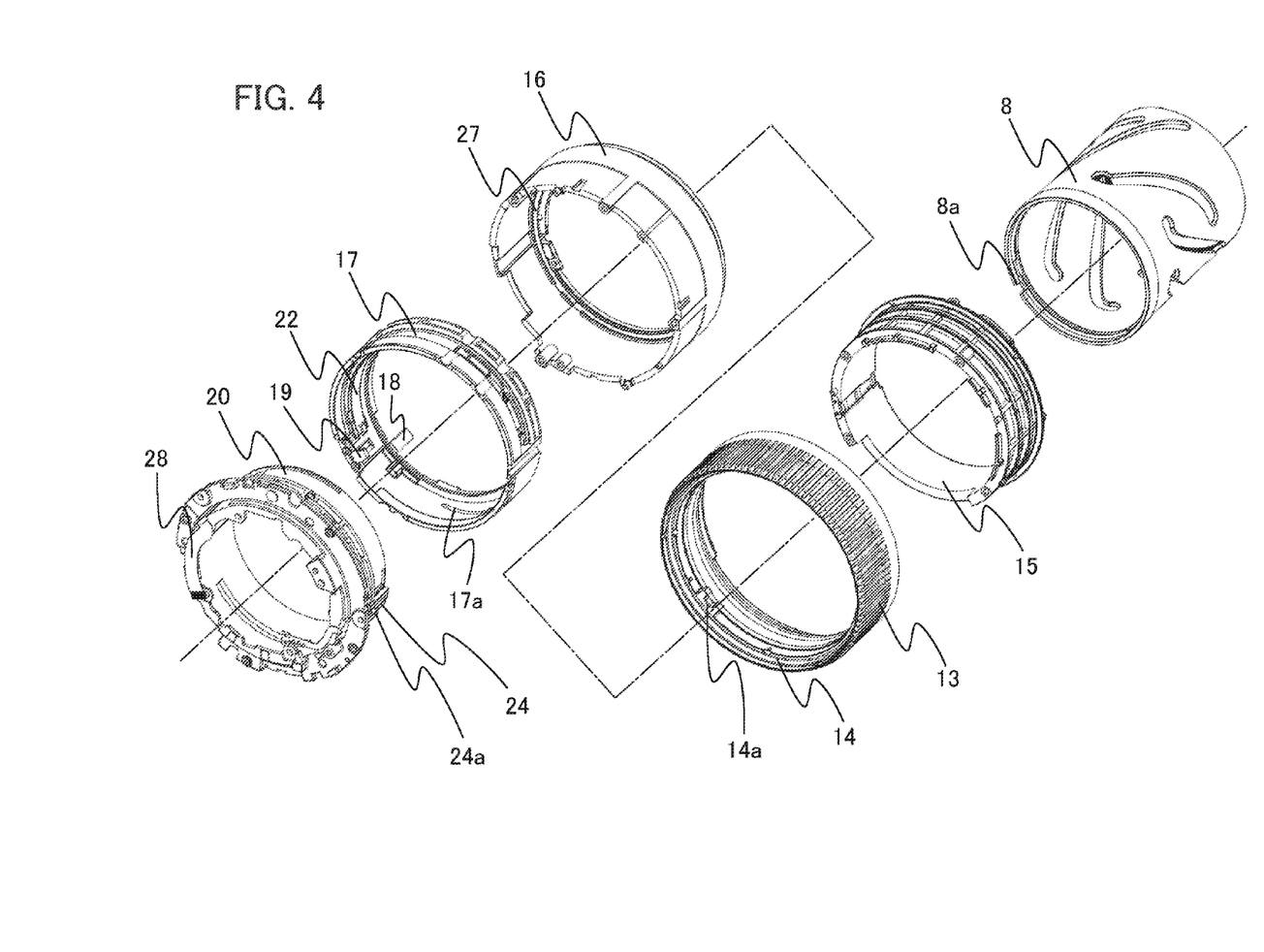
FIG. 4 is an exploded perspective view of the zoom driving unit of FIG. 2 when viewed from the side of an image pickup part.

Next, a configuration of a zoom driving unit 28 according to the present embodiment will be described in detail with reference to FIGS. 2 to 4. FIG. 2 is a perspective view illustrating the zoom driving unit 28. FIG. 3 is an exploded perspective view of the zoom driving unit 28 when viewed from the side of an object. FIG. 4 is an exploded perspective view of the zoom driving unit 28 when viewed from the side of an image pickup part. A manual zoom (hereinafter abbreviated to "MZ") exterior ring 13 and an MZ operating ring 14 are operating members used for a zooming operation. The MZ operating ring 14 is fixed integrally with the MZ exterior ring 13, and is rotatably supported in a state in which it is sandwiched between an MZ fixing member 15 and an MZ cover member 16.

Next, a driving ring 17 is interposed between the MZ cover member 16 and a driving base 20, and thereby is rotatably supported relative to the driving base 20 at a fixed position in the direction of the optical axis. That is, the driving ring 17 is a cylindrical member that is rotatable relative to the driving base 20, and the driving base 20 is a base member for the driving ring 17. The driving ring 17 is supported to have a backlash amount within an allowable range in the direction of the optical axis according to a thickness of a dimension adjusting washer 27. The support of the driving ring 17 in a radial direction (radiation direction) is performed using a plurality of guide rolls 21. In the present embodiment, three guide rolls 21 are divided and disposed on an outer circumference of the driving base 20 at intervals of an approximately uniform angle (about 120 degrees). One of the three guide rolls 21 has a biasing mechanism for the radial direction, and performs backlash removal in the radial directions of the driving ring 17 and the driving base 20.

An MZ operating ring coupling key (hereinafter referred to as "ring coupling key") 18 is a first coupling unit that is provided for the driving ring 17 and is fixed using two screws. The ring coupling key 18 is provided for the driving ring 17, and is engaged with an engaging part 14a of the MZ operating ring 14. A cam cylinder coupling key 19 is a second coupling unit that is provided for the driving ring 17 and is fixed using two screws. The cam cylinder coupling key 19 is engaged with an engaging part 8a of the cam cylinder 8.

When the photographer operates the MZ exterior ring 13 to rotate the MZ operating ring 14, the driving ring 17 rotates about the optical axis via the ring coupling key 18. The driving ring 17 further rotates the cam cylinder 8 about the optical axis via the cam cylinder coupling key 19. As described above, since the cam cylinder 8 rotated in interlock with the driving ring 17 movably holding the first, second, and third group moving members 1a, 2, and 3a, which hold the variable power lens groups, in the direction of the optical axis, the cam cylinder 8 can change image pickup power.

A film scale 22 and a sensor head 23 constitute an optical position detecting encoder. The film scale 22 is a reflection type scale part (detected part) having flexibility in a strip shape, and is mounted along an inner circumferential wall of the driving ring 17. The sensor head 23 that is a detecting part is positioned with respect to the film scale 22 with high precision, and is fixed integrally with the driving base 20.

A variable resistance sensor 24 is fixed integrally with the driving base 20, and has a sensor cam follower 24a that can be advanced or retracted in the direction of the optical axis. The sensor cam follower 24a is engaged with a sensor cam groove 17a provided in the driving ring 17. Thereby, when the driving ring 17 rotates relative to the driving base 20 at a fixed position, the sensor cam follower 24a is advanced or retracted in the direction of the optical axis along with this rotation. In the variable resistance sensor 24, a resistance value is changed depending on a position of the sensor cam follower 24a in the direction of the optical axis. Therefore, the detecting part (not illustrated) can detect a rotation angle of the driving ring 17 by detecting the rotation angle of the driving ring 17 based on an output voltage. In the present embodiment, in addition to the optical position detecting encoder having the film scale 22 and the sensor head 23, rotational position detection of the MZ operating ring 14 is performed using the variable resistance sensor 24.

A configuration and a detection principle of the optical position detecting encoder will be described with reference to FIGS. 5A and 5B and FIGS. 6A to 6C. As an example, a so-called absolute type encoder in which detection of an absolute position is possible will be described, but the present invention is not limited thereto. The absolute position mentioned herein refers to the position of the driving ring 17 on which the film scale 22 is mounted relative to the sensor head 23. The position of the driving ring 17 refers to a position (angle) in a rotational direction in which the optical axis is used as a rotation center axis, and an output signal is generated according to the position in the rotational direction.

Figure 5A:
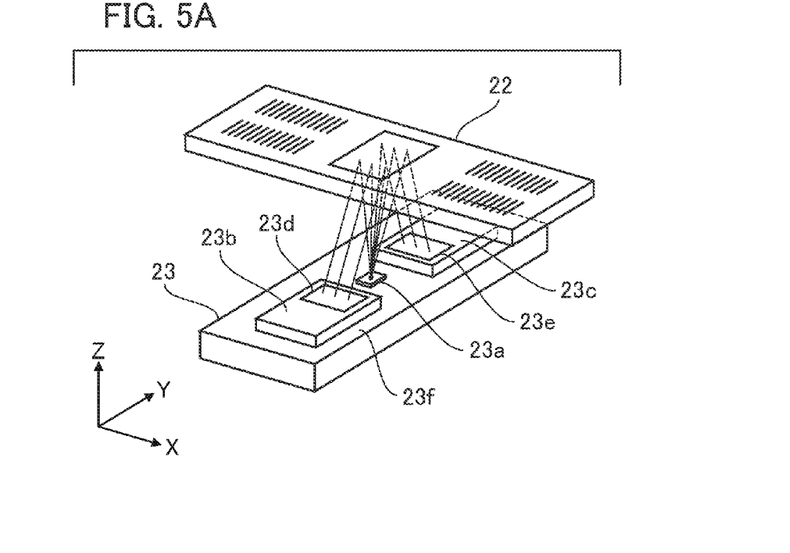
FIGS. 5A and 5B are schematic views illustrating a configuration of an optical position detecting encoder in the present embodiment.
Figure 5B:
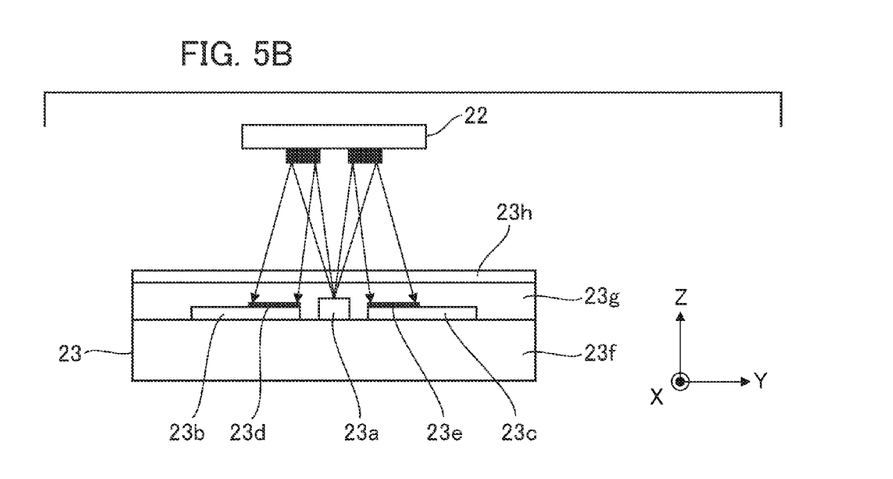

FIGS. 5A and 5B are schematic views illustrating a configuration example of an optical encoder, wherein FIG. 5A is a perspective view and FIG. 5B is a sectional view. For simplified illustration, a configuration in which the film scale 22 is developed in a circumferential direction will be described. In coordinate axes illustrated in FIGS. 5A and 5B, an X-axial direction indicates a direction developed in the circumferential direction, a Y-axial direction indicates the direction of the optical axis, and a Z-axial direction indicates the radial direction. FIG. 5B illustrates a structure viewed from the X-axial direction on a Y-Z plane.

The film scale 22 is disposed with a portion thereof facing the sensor head 23. The film scale 22 is fixed integrally with the driving ring 17, and is movable in a pattern arrangement direction. The pattern arrangement direction is the X direction, that is, the circumferential direction. The sensor head 23 is provided with a light source 23a, and a plurality of light receiving parts. The light source 23a is a light emitting part having a light emitting diode (LED) chip. Photo IC chips 23b and 23c are configured as the light receiving parts. The photo IC chips 23b and 23c have signal processing circuits mounted therein, and are provided with respective photodiode arrays 23d and 23e. The photodiode arrays 23d and 23e are light receiving elements mounted on the respective photo IC chips 23b and 23c. The sensor head 23 is a laminated structure made up of a printed board 23f, a transparent resin 23g, and a protection glass 23h. The light source 23a and the photo IC chips 23b and 23c are mounted on the printed board 23f, and are encapsulated by the transparent resin 23g and the protection glass 23h.

Figure 6A:
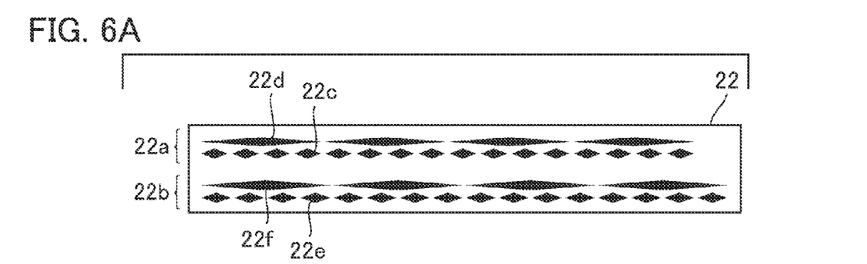
FIGS. 6A to 6C are diagrams illustrating a configuration and a position detection signal of a scale part in the present embodiment.
Figure 6B:
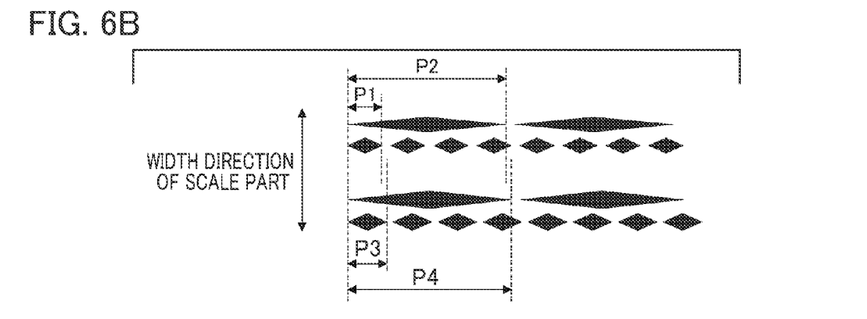

Next, a configuration example of the film scale 22 will be described with reference to FIGS. 6A to 6C. FIG. 6A is a diagram illustrating a whole configuration of the film scale 22, and FIG. 6B is an enlarged view of a slit pattern. The slit pattern is formed by a reflective film.

The film scale 22 has a long rectangular shape, and has tracks extending in the direction of a long side. The tracks of the present embodiment include a first track 22a and a second track 22b. The first track 22a is disposed at an upper side of FIG. 6A in the direction of a width (short side) of the scale part. The second track 22b is disposed at a lower side of FIG. 6A in the direction of the width of the scale part. A reflective pattern of the first track 22a is configured of the following patterns made up of a plurality of rhomboidal portions.

Periodic pattern 22c of pitch P1
Periodic pattern 22d of pitch P2
Here, P1<P2.

A reflective pattern of the second track 22b is configured of the following patterns made up of a plurality of rhomboidal portions.

Periodic pattern 22e of pitch P3
Periodic pattern 22f of pitch P4
Here, P3<P4.

The pitch P3 is slightly greater than the pitch P1, and the pitch P4 is slightly greater than the pitch P2. A relationship between the pitches is "P1<P3<P2<P4." The period of a vernier detection signal is formed by the pitches P1 and P3 and the pitches P2 and P4. Light emitted from the light source 23a is cast on each of the patterns 22c to 22f of the film scale 22. The light cast on the first track 22a in which the patterns 22c and 22d are formed and the light cast on the second track 22b in which the patterns 22e and 22f are formed are reflected by the respective patterns. The reflected light caused by the patterns 22c and 22d is incident upon the first light receiving part (photodiode array 23d), and the reflected light caused by the patterns 22e and 22f is incident upon the second light receiving part (photodiode array 23e). An amount of the emitted light of the light source 23a is controlled by a controller (not illustrated) based on total output of an amount of the light incident upon the first and second light receiving parts, and output signal amplitudes of the first and second light receiving parts are maintained at a constant value. This leads to a configuration in which a change in light emitting efficiency is not influenced by factors such as a temperature environment or time-dependent changes of the light source 23a. Each output signal obtained from the photo IC chips 23b and 23c is a combination of sinusoidal signals having a phase difference of 90 degrees in correspondence with each of the pitches P1, P2, P3, and P4.

Figure 6C:
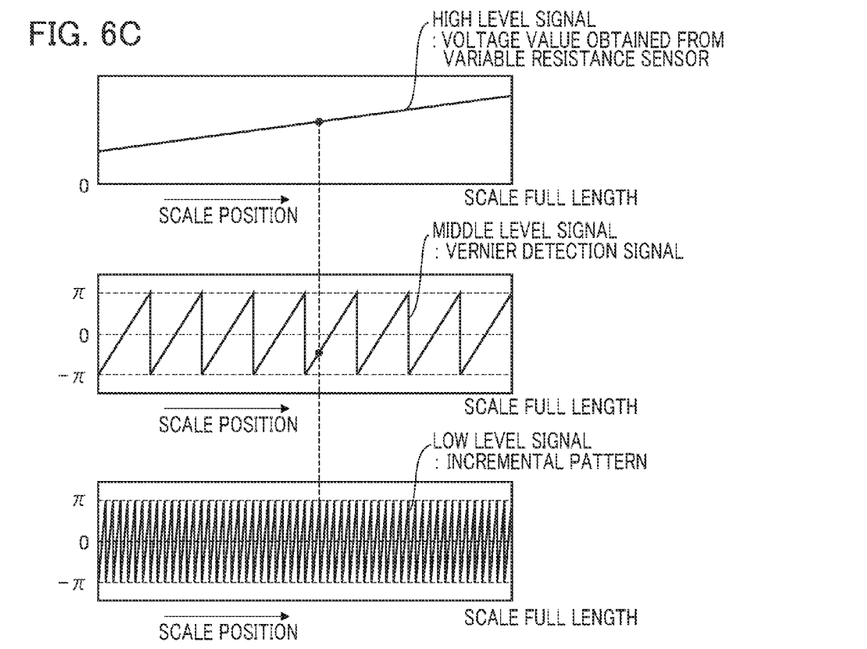

A detection principle of the absolute position will be described with reference to FIG. 6C. FIG. 6C is an diagram illustrating signal synchronization, and illustrates a relationship between a signal amplitude and a scale position. In FIG.

6C, a high level signal, a middle level signal, and a low level signal are illustrated from above to below. The low level signal illustrated in FIG. 6C is the signal of an incremental pattern. That is, the low level signal is a periodic signal that fluctuates between $-\pi$ and $+\pi$ (radians) by inverse tangent transformation of two sinusoidal signals in which the pitch P1 obtained from the photo IC chip 23b is out of phase by 90 degrees. Similarly, a phase signal of the pitch P3 is obtained from the photo IC chip 23c. A signal obtained by subtracting these phase signals is the middle level signal (vernier detection signal) illustrated in FIG. 6C. The high level signal illustrated in FIG. 6C is an oblique linear signal obtained from an output voltage value of the variable resistance sensor 24. The absolute position is specified by performing signal synchronization processing. That is, in the signal synchronization processing, which order a detected position occupies among repeated signals of the middle level signal is specified based on an output value of the high level signal, and which order a detected position occupies among repeated signals of the low level signal is specified based on an output value of the middle level signal.

Figure 7A:
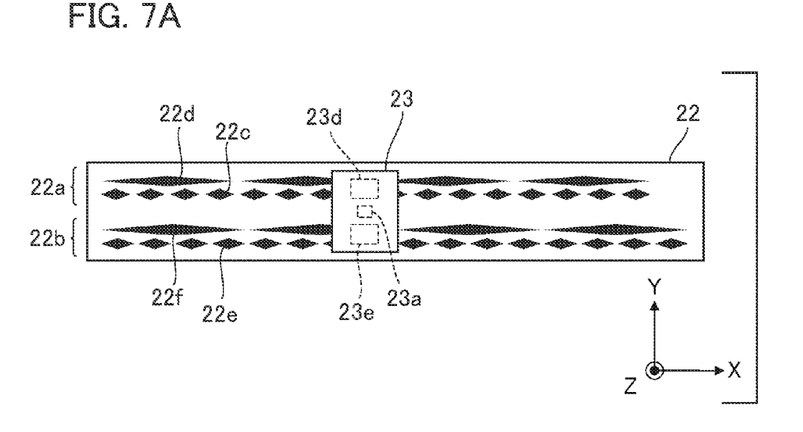
FIGS. 7A and 7B are diagrams illustrating position detection in the present embodiment.
Figure 7B:
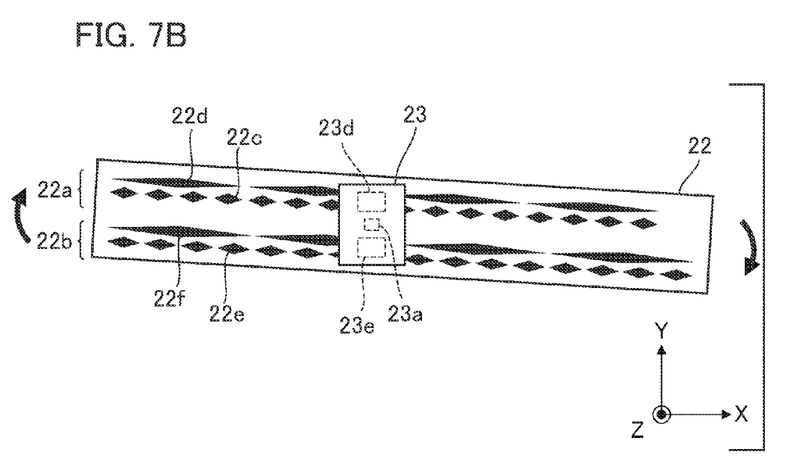

Next, signal synchronization using the case in which precision of the absolute position detection is reduced as an example will be described with reference to FIGS. 7A and 7B. The direction perpendicular to the plane of FIGS. 7A and 7B is the Z-axial direction, the leftward/rightward direction is the X-axial direction, and the upward/downward direction is the Y-axial direction. FIG. 7A illustrates a case in which a relative positional relationship between the reflective patterns (22c to 22f) of the first and second tracks 22a and 22b of the film scale 22 and the first and second light receiving parts (23d) and (23e) of the sensor head 23 is in a normal state. In this case, the direction of the long side of the film scale 22 is parallel to the X-axial direction.

In contrast, FIG. 7B illustrates a case in which a relative positional relationship between the film scale 22 and the sensor head 23 moves about a Z axis. In this case, the direction of the long side of the film scale 22 is inclined with respect to the X-axial direction. The light emitted from the light source 23a is reflected by the reflective patterns (22c to 22f) of the first and second tracks 22a and 22b of the film scale 22, and then cannot be correctly received into the first and second light receiving parts (23d) and (23e) of the sensor head 23. As a result, if a great influence is exerted on the middle and low level signals, the signal synchronization may not be performed. Therefore, it is necessary to maintain the relative position between the film scale 22 and the sensor head 23 with high precision.

Figure 8:
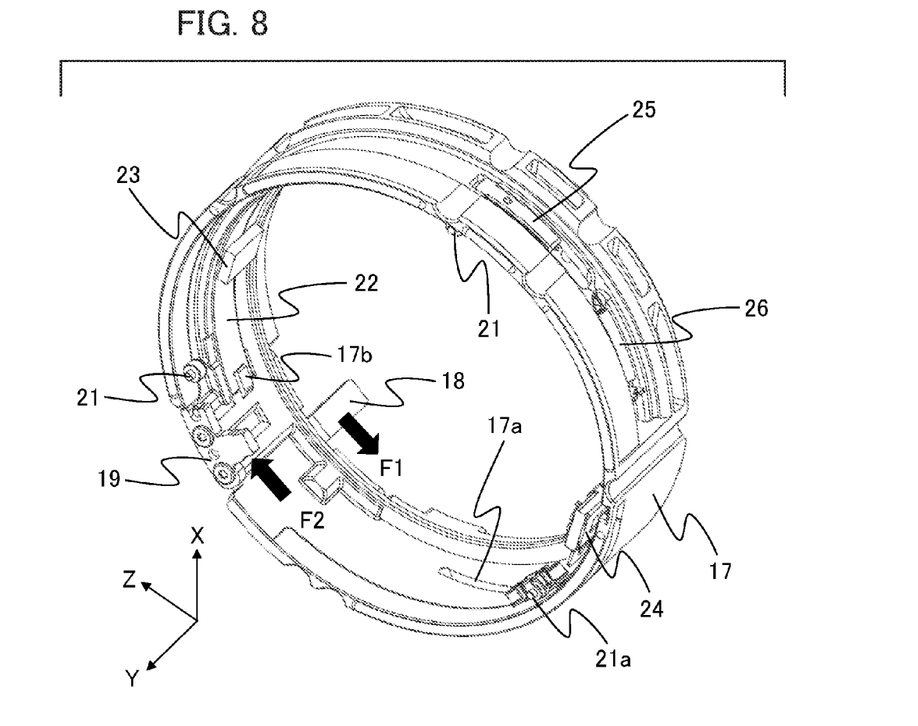
FIG. 8 is a perspective view illustrating a drive ring unit in the present embodiment.

The configuration of a drive ring unit will be described in detail with reference to FIG. 8. FIG. 8 is a perspective view of major parts for describing the drive ring unit at a WIDE (wide angle) end position. Hereinafter, the drive ring unit refers to the ring coupling key 18, the cam cylinder coupling key 19, and the film scale 22, which are integrated with the driving ring 17, and mechanisms of their holding parts.

In the driving ring 17, one end of the film scale 22 provided at an inner circumferential wall of the driving ring 17 is regulated in position in the circumferential direction and the radial direction by a stationary protrusion 17b. A scale holding plate 25 is a holding member of the film scale 22, and is movable in the circumferential direction of the driving ring 17. A scale biasing spring 26 applies a biasing force to the film scale 22 via the scale holding plate 25 in the circumferential direction of the driving ring 17. That is, the film scale 22 is mounted on the inner circumferential wall of the driving ring 17 in a state in which one end thereof is held by the stationary protrusion 17b provided for the driving ring 17, and the other end thereof is biased in the circumferential direction by the scale biasing spring 26. Since the film scale 22 is fixed while receiving an elastic force of the scale biasing spring 26, even when the film scale 22 is expanded or contracted by an influence of a change in temperature, moisture absorption, or the like, an excessive force is not applied. For this reason, it is possible to maintain the positions of the reflective patterns (22c to 22f) of the first and second tracks 22a and 22b of the film scale 22 with high precision. It is assumed that opposite ends of the film scale 22 are fixed to the driving ring 17. In this case, there is a possibility of distortion occurring at the film scale 22 along with expansion or contraction, and the signal synchronization may be impossible if an influence exerted on the middle and low level signals is remarkable. In the present embodiment, measure are taken for the case in which the film scale 22 is expanded or contracted, and thereby there is hardly any influence exerted on the middle and low level signals.

Figure 9:
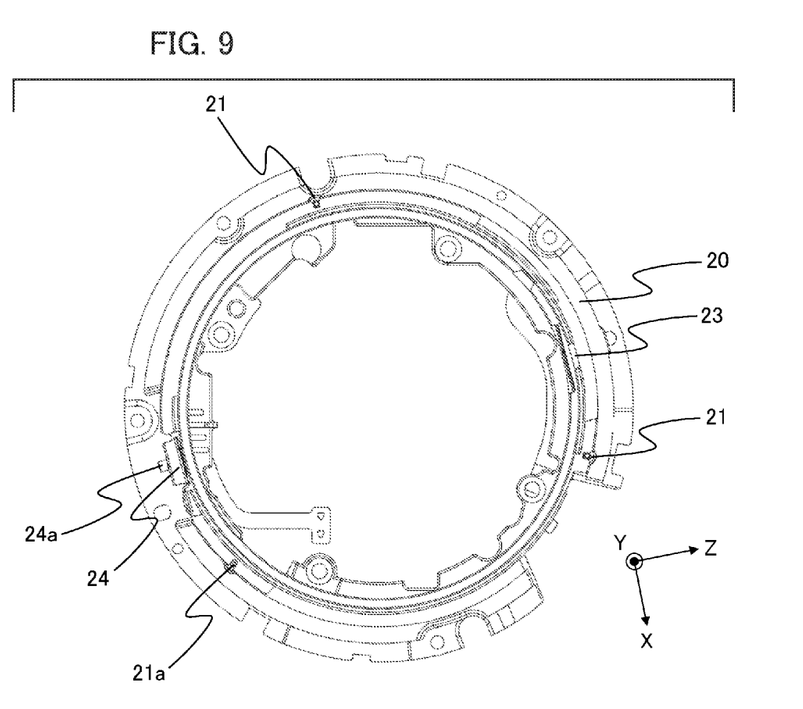
FIG. 9 is a front view illustrating a drive base unit in the present embodiment.

A configuration of the drive base unit will be described with reference to FIG. 9. FIG. 9 is a front view of the drive base unit when viewed from the Y-axial direction. The drive base unit is provided with the sensor head 23, the variable resistance sensor 24, and rolling members, all of which are integrated with the driving base 20. In the present embodiment, as the rolling members, two guide rolls 21 supported to be able to be rolled and a guide roll 21a having a biasing mechanism in the radial direction are given as an example.

Figure 10A:
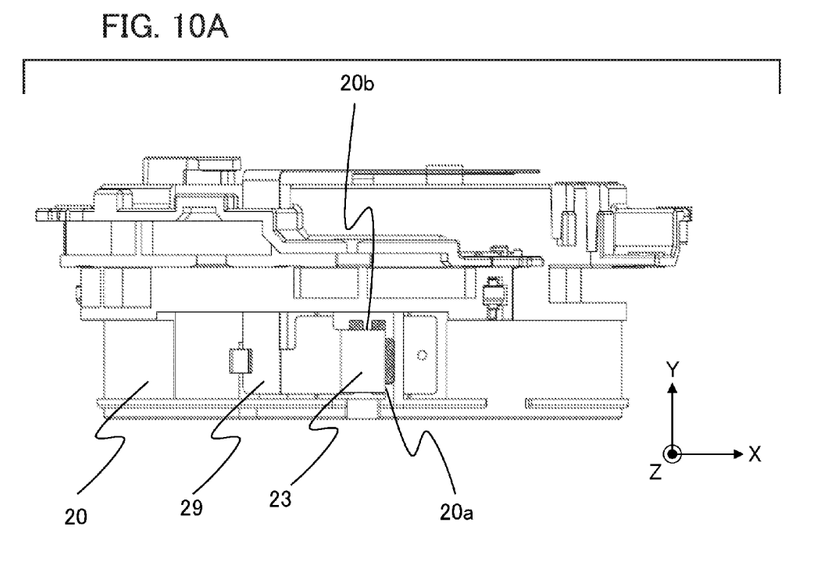
FIGS. 10A and 10B are diagrams illustrating positioning of a sensor head in the present embodiment.
Figure 10B:
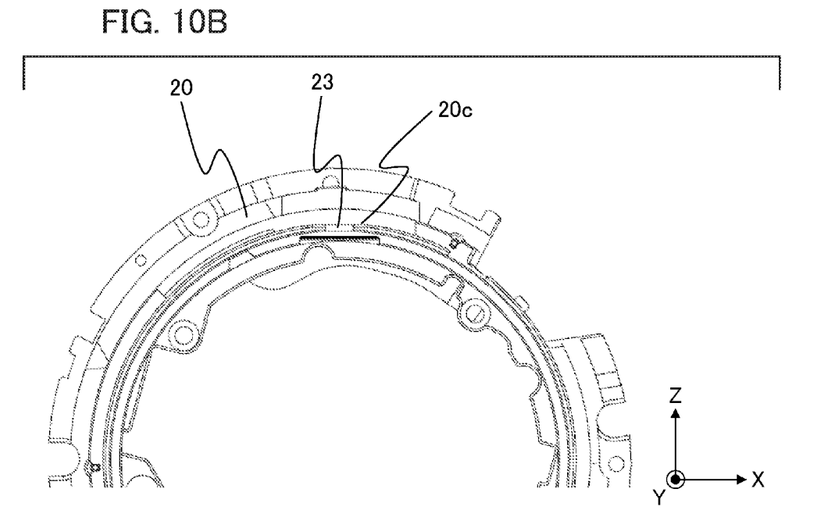

Next, positioning of the sensor head 23 will be described with reference to FIGS. 10A and 10B. FIG. 10A illustrates the drive base unit when viewed from the Z-axial direction. FIG. 10B partly illustrates the drive base unit when viewed from the direction of the optical axis (Y-axial direction). A sensor head board 29 is a flexible circuit board, and the sensor head 23 is mounted thereon. The sensor head 23 and the sensor head board 29 are held on the driving base 20 in order to detect the position of the driving ring 17. The sensor head 23 is adhered and fixed to a sensor mounting surface of the driving base 20 using a tool (not illustrated) after being positioned by abutment. A plurality of adhering and fixing parts are represented as oblique parts in FIG. 10A. The sensor head 23 is positioned to abut a plurality of mounting surface portions. A process of abutting the sensor head 23 on the sensor mounting surface portion 20a in the circumferential direction and then the sensor head 23 on the sensor mounting surface portion 20b in the direction of the optical axis (Y-axial direction) is performed. A tool (not illustrated) is used in the radial direction (Z-axial direction), and thereby the sensor head 23 is mounted on the same plane as the sensor mounting surface portion 20c.

Figure 11A:
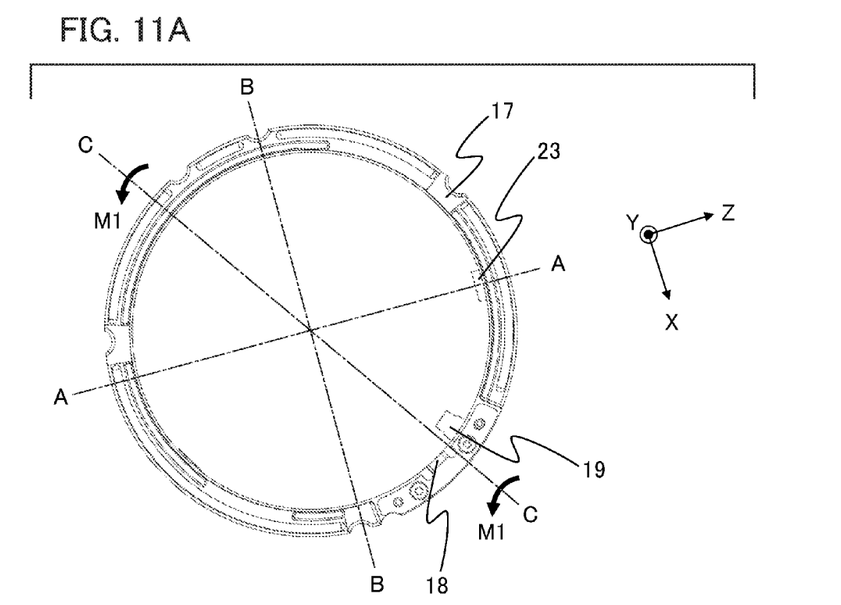
FIGS. 11A and 11B are diagrams illustrating a positional relationship between the sensor head and a coupling key in the present embodiment.
Figure 11B:
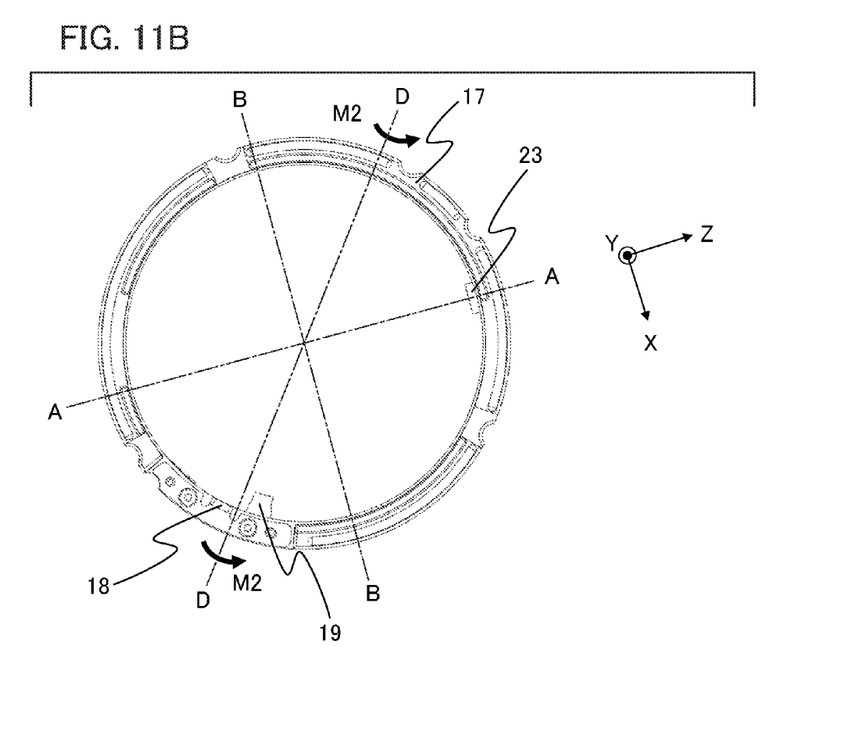

Next, a positional relationship between the sensor head 23 and the ring coupling key 18 and between the sensor head 23 and the cam cylinder coupling key 19 will be described in detail with reference to FIGS. 8, 11A, and 11B. FIG. 11A is a front view of major parts illustrating the drive ring unit at a WIDE end position when viewed from the front. FIG. 11B is a front view of major parts illustrating the drive ring unit at a TELE end position when viewed from the front. An axis A-A is a first axis that is perpendicular to the optical axis and passes through a central portion of the sensor head 23, and an axis B-B is an axis that is perpendicular to the optical axis and is perpendicular to the axis A-A on an X-Z plane. An axis C-C and an axis D-D are axes that are perpendicular to the optical axis and pass through the coupling unit on the X-Z plane. In the present embodiment, for convenience of description, an axis that is perpendicular to the optical axis and passes between the ring coupling key 18 and the cam cylinder coupling key 19 is set as a second axis, but it may be an axis passing through any coupling key.

As illustrated in FIG. 8, in the event of a manual operation from the WIDE end position, an action force F1 acts on the ring coupling key 18 by receiving an operating force of a photographer from the MZ operating ring 14. The driving ring 17 transmits the operating force to the cam cylinder 8 via the cam cylinder coupling key 19 by the action force F1. At this time, the cam cylinder coupling key 19 receives a reaction force F2 from the cam cylinder 8. As illustrated in FIG. 11A, due to the action force F1 and the reaction force F2, a moment M1 around an axis C-C acts on the driving ring 17. Also, as illustrated in FIG. 11B, in the event of a manual operation from the TELE end position, since the operating force acts in a direction opposite to the operating force in the case of FIG. 11A, a moment M2 around an axis D-D acts on the driving ring 17. As described with reference to FIG. 7B, as an example of the case in which the absolute position detection of the optical position detecting encoder is not accurately performed, the case in which the relative positional relationship between the film scale 22 and the sensor head 23 moves around the Z axis is given. Accordingly, movement around the axis A-A is most disadvantageous, and movement around the axis B-B in which a phase is shifted on the X-Z plane by 90 degrees with respect to the axis A-A is most advantageous.

In the present embodiment, a positional relationship between the sensor head 23 and the ring coupling key 18 and between the sensor head 23 and the cam cylinder coupling key 19 in a direction centered on the optical axis has arrangement of approximately a right angle at a center position of a rotational range (from a WIDE end to a TELE end) of the driving ring 17. That is, an angle between the axis B-B and the axis C-C in relation to the optical axis in FIG. 11A and an angle between the axis B-B and the axis D-D in relation to the optical axis in FIG. 11B are the same or almost the same. In the case of the absolute position detection of the optical position detecting encoder, a configuration in which the most disadvantageous moment around the axis A-A is avoided and the most advantageous mount around the axis B-B is applied is adopted, and thereby the relative position between the film scale 22 and the sensor head 23 can be maintained with high precision. Therefore, the number of components is reduced, and the position detection is possible with high precision and high resolution.

Figure 12:
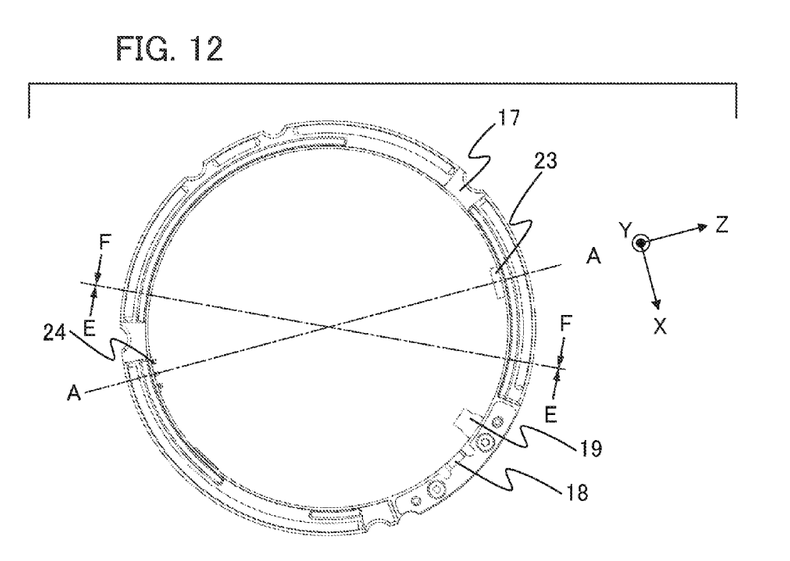
FIG. 12 is a front view illustrating the drive ring unit in the present embodiment.
Figure 13A:
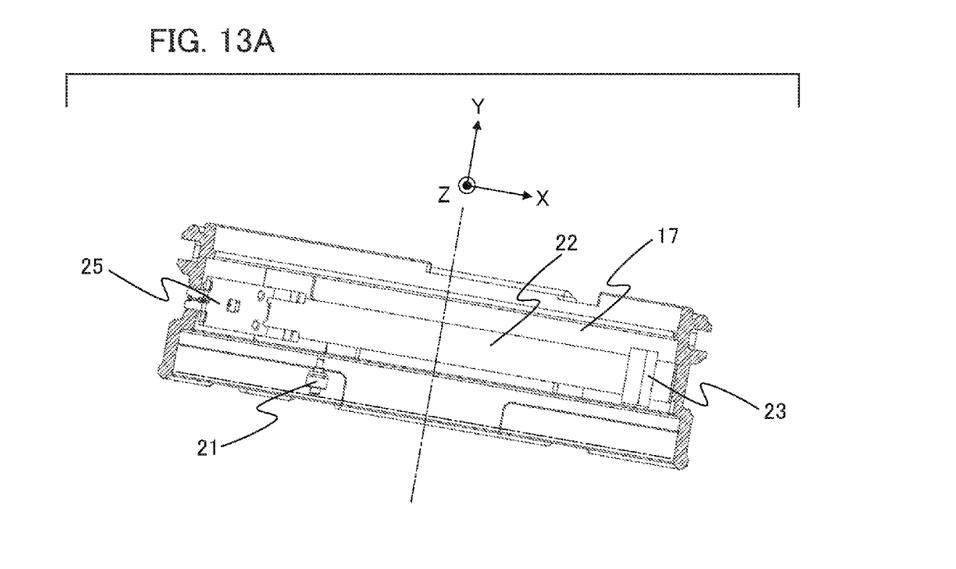
FIGS. 13A and 13B are diagrams illustrating a positional relationship between the sensor head and a variable resistance sensor in the present embodiment.
Figure 13B:
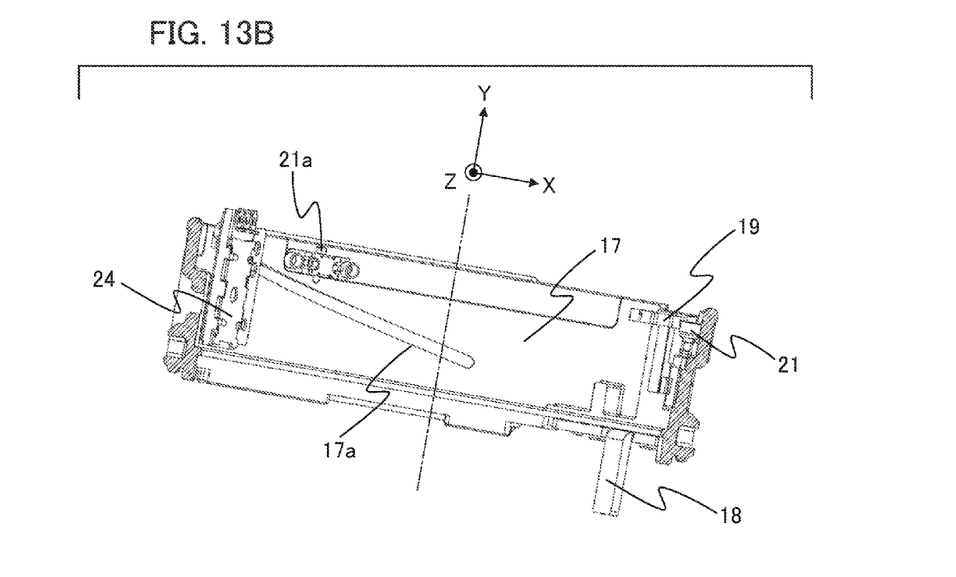

Next, a positional relationship between the sensor head 23 and the variable resistance sensor 24 in a direction centered on the optical axis will be described in detail with reference to FIGS. 12, 13A and 13B. FIG. 12 is a front view of major parts illustrating the drive ring unit when viewed from the front. FIG. 13A is a sectional view of the drive ring unit when viewed from an arrow direction along line E-E of FIG. 12, and illustrates a positional relationship of the optical position detecting encoder made up of the sensor head 23 and the film scale 22. FIG. 13B is a sectional view of the drive ring unit when viewed from an arrow direction along line F-F of FIG. 12, and illustrates a positional relationship between the variable resistance sensor 24, the sensor cam groove 17a, the ring coupling key 18, and the cam cylinder coupling key 19. The axis A-A is an axis that is perpendicular to the optical axis and passes through the sensor head 23 and the variable resistance sensor 24 on the X-Z plane. The sensor cam groove 17a is engaged with the sensor cam follower 24a (see FIG. 9). The sensor cam groove 17a, the ring coupling key 18, the cam cylinder coupling key 19, the film scale 22, the sensor head 23, the variable resistance sensor 24, and the scale holding plate 25 are provided approximately on the same radius as the inner circumference of the driving ring 17.

In the present embodiment, the positional relationship between the sensor head 23 and the ring coupling key 18 and between the sensor head 23 and the cam cylinder coupling key 19 in the direction centered on the optical axis has the arrangement of approximately a right angle at the center position of the rotational range of the driving ring 17. Also, the positional relationship between the sensor head 23 and the variable resistance sensor 24 is set to be symmetrical with respect to a rotation central axis of the driving ring 17, and thereby space efficiency can be improved. The sensor head 23, the film scale 22, the variable resistance sensor 24, and the sensor cam groove 17a are provided for each unit of the driving ring 17 and the driving base 20, and the high-precision position detection is possible. According to the present embodiment, the positional relationship between the film scale 22 and the sensor head 23 can be maintained with high precision in relation to the moment generated by the operating force of the photographer in the MZ operation. Therefore, it is unnecessary to use components called a pressing spring, a slip ring, and a differential roll, and the number of components can be reduced. According to the present embodiment, even when the cylindrical member moves within an allowed backlash in the direction of the optical axis, the optical device comprising the encoder in which the position detection is possible with high precision and high resolution can be realized.

Also, in the position detection of the cylindrical member, the conventional optical device using the optical position detecting encoder configured of the detecting part and the detected part (scale part having the reflective pattern) may receive an influence caused by attachment of foreign materials such as dust. In contrast, in the present embodiment, the first optical position detecting unit comprising the detecting part and the detected part and the second position detecting unit using the variable resistance sensor are used in combination, and thereby the position detection that is hardly influenced by attachment of foreign materials such as dust can be realized. According to the present embodiment, the position detection having high precision and high resolution can be compatible with reliability.

While the present invention has been described with reference to exemplary embodiments, the present invention is not limited to the disclosed exemplary embodiments, and various variations and modifications are possible within the range of the gist of the present invention. For example, the positional relationship between the detecting part and the coupling unit in the direction centered on the optical axis may not only have the arrangement of approximately a right angle at the center position of the rotational range of the cylindrical member, but may also be set to an angle with a predetermined range including a right angle. In the case of the driving ring 17, the predetermined range is a range excluding a position that is separated from the axis A-A that is most disadvantageous in the absolute position detection of the encoder in the direction centered on the optical axis in FIGS. 11A and 11B, i.e., the vicinity of the axis A-A. Such a range is, for example, a range which is set to a range including the vicinity of the axis B-B and within which an influence on the relative positional relationship between the scale part and the sensor part is small when the moment of force is applied to the cylindrical member in the MZ operation. That is, when viewed from a direction along the rotation central axis of the cylindrical member, the first axis that is perpendicular to the rotation central axis and passes through the detecting part and the second axis that is perpendicular to the rotation central axis and passes through the coupling unit have a positional relationship having an angle falling within a range including 90 degrees within a rotational range of the cylindrical member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-041188, filed Mar. 3, 2015, which is hereby incorporated by reference herein in its entirety.

What is claimed is:

1. An optical device comprising:
a first member;
a second member that is rotatable relative to the first member around a rotation central axis;
a coupling unit that is disposed at the second member; and
a position detecting unit that has a detecting part disposed at the first member and a detected part disposed at the second member, and is configured to detect a position of the second member relative to the first member,
wherein, when viewed from a direction of the rotation central axis, an angle between a first axis and a second axis is 90 degrees at a predetermined position within a rotational range of the second member, and
wherein the first axis is an axis that is perpendicular to the rotation central axis and passes through the detecting part and the second axis is an axis that is perpendicular to the rotation central axis and passes through the coupling unit.

2. The optical device according to claim 1, wherein the detecting part and the coupling unit are in a positional relationship in which the first axis and the second axis form a right angle, and
wherein the position of the second member in a direction centered on the rotation central axis is a central position within the rotational range.

3. The optical device according to claim 1, wherein the coupling unit includes first and second coupling units disposed at the second member.

4. The optical device according to claim 3, further comprising:
an operating member that is engaged with the first coupling unit; and
a rotary member that is engaged with the second coupling unit and configured to rotate in conjunction with the rotation of the second member by the operating member.

5. The optical device according to claim 1, further comprising
a first position detecting unit that optically detects a position of the second member relative to the first member is set as a first position detecting unit,
wherein the optical device further includes a second position detecting unit that detects the position of the second member relative to the first member using a change in resistance value.

6. The optical device according to claim 5, wherein the second position detecting unit has a variable resistance sensor mounted on the first member, and
wherein, when viewed from the direction along the rotation central axis, the variable resistance sensor is symmetrically disposed with respect to the detecting part constituting the first position detecting unit with the rotation central axis interposed therebetween.

* * * * *